United States Patent
Han et al.

(10) Patent No.: US 12,447,869 B2
(45) Date of Patent: Oct. 21, 2025

(54) SEAT CONTROL APPARATUS AND METHOD

(71) Applicants: HYUNDAI MOTOR COMPANY, Seoul (KR); KIA CORPORATION, Seoul (KR)

(72) Inventors: Kug Hun Han, Seoul (KR); Jun Hwan Lee, Seoul (KR); Mun Seung Kang, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 189 days.

(21) Appl. No.: 18/516,045

(22) Filed: Nov. 21, 2023

(65) Prior Publication Data

US 2025/0026247 A1    Jan. 23, 2025

(30) Foreign Application Priority Data

Jul. 18, 2023    (KR) .......................... 10-2023-0093164

(51) Int. Cl.
*B60N 2/02*    (2006.01)
*B60N 2/00*    (2006.01)

(52) U.S. Cl.
CPC ......... *B60N 2/0256* (2023.08); *B60N 2/0021* (2023.08); *B60N 2/02246* (2023.08)

(58) Field of Classification Search
CPC . B60N 2/0021; B60N 2/02246; B60N 2/0256
See application file for complete search history.

(56) References Cited

U.S. PATENT DOCUMENTS

| | | | |
|---|---|---|---|
| 10,576,846 B2 | 3/2020 | Lee et al. | |
| 11,148,557 B2 | 10/2021 | Lee et al. | |
| 2006/0208549 A1* | 9/2006 | Hancock | B60N 2/06 297/342 |
| 2017/0151893 A1* | 6/2017 | Kojima | A47C 1/025 |
| 2018/0141470 A1 | 5/2018 | Lee et al. | |
| 2019/0359093 A1* | 11/2019 | Nishide | B60N 2/0228 |
| 2021/0138934 A1 | 5/2021 | Lee et al. | |
| 2022/0203913 A1* | 6/2022 | You | B60N 2/02246 |
| 2024/0375553 A1* | 11/2024 | Han | B60N 2/0272 |
| 2024/0375555 A1* | 11/2024 | Han | B60N 2/0244 |
| 2024/0375556 A1* | 11/2024 | Han | B60N 2/0273 |

FOREIGN PATENT DOCUMENTS

| | | |
|---|---|---|
| KR | 20180056042 A | 5/2018 |
| KR | 102286924 B1 | 8/2021 |

* cited by examiner

*Primary Examiner* — Philip F Gabler
(74) *Attorney, Agent, or Firm* — Lempia Summerfield Katz LLC

(57) ABSTRACT

A seat control apparatus includes a first driving part, a second driving part and a controller. The apparatus is configured to receive a user input on a walk-in mode through an input part, and based on the received user input, the apparatus controls a slide location of a seat to a walk-in location area corresponding to the walk-in mode by using the first driving part, and controls a reclining angle of the seat to a walk-in angle area corresponding to the walk-in mode by using the second driving part. In particular, when the user input is received again through the input part, the apparatus restores the reclining angle of the seat from the walk-in angle area to an un-walk-in angle area by using the second driving part.

10 Claims, 10 Drawing Sheets

SEAT CONTROL APPARATUS AND METHOD

CROSS-REFERENCE TO RELATED APPLICATION

This application claims the benefit of and priority to Korean Patent Application No. 10-2023-0093164, filed in the Korean Intellectual Property Office on Jul. 18, 2023, the entire contents of which are incorporated herein by reference.

TECHNICAL FIELD

The present disclosure relates to a seat control apparatus and a seat control method, and more particularly, to a technology of controlling an operation mode of a specific seat.

BACKGROUND

With the development of the technologies, various components may be connected to each other in an interior of a vehicle. In particular, the seat control apparatus may promptly and accurately provide various functions by performing a cooperative control between the components for convenience of a user.

For example, the vehicle may include a plurality of seats, and to control a position (or an operation mode) of a seat, a cooperative control of at least one of a reclining angle, a side location, or a tiling location of the seat, or any combination thereof may be required. As an example, technologies for enhancing a convenience of riding of a user by adjusting (e.g., adjusting a location of a specific seat to a walk-in mode) a location of a specific seat that is present on a front side of a rear seat for riding when a user gets on the rear seat of the specific seat.

However, as the types of devices (e.g., a driving part) for changing a state of a set is limitedly provided, it is difficult to provide a seat state, in which a user may get on and off the vehicle maximally conveniently.

For example, when a user inputs a walk-in mode operation instruction (e.g., a physical user input to a button) to a front seat (hereinafter, a seat) to allow the user to easily get on the rear seat, a seat control apparatus may perform a control such that the slide location and/or the reclining angle of the seat corresponds to the walk-in mode. After the seat control apparatus controls the position of the seat to the walk-in mode in response to the user input, the user may manually move the slide location of the seat to an un-walk-in angle area location area (e.g., an area on a rear side of a walk-in location area) corresponding to an un-walk-in angle area mode. When a user input is received from the user again after the situation, the reclining angle is controlled to the un-walk-in angle area corresponding to the un-walk-in angle area mode by using a motor for controlling the reclining angle of the seat as the seat control apparatus identifies that a previous operation mode is the walk-in mode, but the driving part (e.g., a fixing part) for controlling the slide location repeatedly performs the same operation (e.g., unlocking) in correspondence to the user input whereby a gap may be generated between the reclining angle and the slide location.

The statements in this section merely provide background information related to the present disclosure and may not constitute prior art.

SUMMARY

The present disclosure has been made to solve the above-mentioned problems occurring in the prior art while advantages achieved by the prior art are maintained intact.

An aspect of the present disclosure provides a seat control apparatus that, when receiving a user input regarding a walk-in mode through an input part, may control a location (or a position) of a seat to correspond to a walk-in mode by using a first driving part and a second driving part for controlling a slide location and a reclining angle, respectively.

An aspect of the present disclosure also provides a seat control apparatus that may control a location of a seat to, among locations according to a walk-in mode or an un-walk-in angle area mode, a location that is opposite to a previous operation mode of the seat in response to a user input by using a first driving part and a second driving part including different types of devices.

An aspect of the present disclosure also provides a seat control apparatus that fixes (or fastens) a portion of a seat to one point of an un-walk-in location area by using a fixing part included in a first driving part.

An aspect of the present disclosure also provides a seat control apparatus that adjusts a reclining angle of a seat to an un-walk-in angle area according to an un-walk-in angle area mode or a walk-in angle area according to a walk-in mode by using a motor included in a second driving part.

An aspect of the present disclosure also provides a seat control apparatus that may adaptively and efficiently change an operation mode of a seat by using at least one of a seat position sensor, at least one Hall sensor, a rear seat passenger detecting sensor, or any combination thereof.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, a seat control apparatus includes an input part disposed in one area of a seat, a first driving part that adjusts a slide location of the seat, a second driving part that adjusts a reclining angle of the seat, a memory that stores one or more instructions, and a controller operatively connected to the first driving part, the second driving part, and the memory. The instructions may be configured to, when being executed by the controller, cause the seat control apparatus to receive a user input on a walk-in mode through the input part, based on the received user input, control the slide location of the seat to a walk-in location area corresponding to the walk-in mode by using the first driving part, and control the reclining angle of the seat to a walk-in angle area corresponding to the walk-in mode by using the second driving part. When the user input is received again through the input part, the instructions may be configured to, when being executed by the controller, cause the seat control apparatus to restore the reclining angle of the seat from the walk-in angle area to an un-walk-in angle area by using the second driving part.

According to an embodiment, the first driving part may include a fixing part that locks the seat to the un-walk-in location area corresponding to an un-walk-in angle area mode, and the second driving part may include a motor.

According to an embodiment, the instructions may be configured to, when being executed by the controller, cause the seat control apparatus to unfasten the seat and the fixing part by activating an actuator included in the fixing part based the received user input, and the seat may be moved to one point included in the walk-in location area on a front side of a current location, by a repulsive force of a spring. The repulsive force is generated while unfastening the fixing part.

According to an embodiment, the instructions may be configured to, when being executed by the controller, cause the seat control apparatus to control the reclining angle of the seat to the walk-in angle area including a front area of the seat by using the motor.

According to an embodiment, the instructions may be configured to, when being executed by the controller, cause the seat control apparatus to identify a previous operation mode of the seat. When the identified previous operation mode is an un-walk-in angle area mode that is opposite to the walk-in mode, the instructions may be configured to, when being executed by the controller, cause the seat control apparatus to control the seat to the walk-in mode by using the first driving part and the second driving part. When the identified previous operation mode is the walk-in mode, the instructions may be configured to, when being executed by the controller, cause the seat control apparatus to control the slide location of the seat to an un-walk-in location area corresponding to the un-walk-in angle area mode by using the first driving part, and control the reclining angle of the seat to the un-walk-in angle area corresponding to the un-walk-in angle area mode by using the second driving part.

According to an embodiment, the seat control apparatus may further include a seat position sensor, the instructions may be configured to, when being executed by the controller, cause the seat control apparatus to identify a seat operation state including at least one of the slide location of the seat, the reclining angle of the seat, or any combination thereof by using the seat position sensor, and control an operation mode of the seat to the walk-in mode or an un-walk-in angle area mode through the first driving part and the second driving part, based on the seat operation state.

According to an embodiment, the seat control apparatus may further include at least one Hall sensor, the instructions may be configured to, when being executed by the controller, cause the seat control apparatus to identify the reclining angle of the seat by using the at least one Hall sensor, and when it is identified that the reclining angle is included in the walk-in angle area, change the previous operation mode of the seat to an un-walk-in angle area mode.

According to an embodiment, the instructions may be configured to, when being executed by the controller, cause the seat control apparatus to, when a walk-in control signal that instructs the seat to be controlled in the walk-in mode is received through the input part, control the slide location of the seat to the walk-in location area by using the first driving part, and control the reclining angle of the seat to the walk-in angle area by using the second driving part. Upon receiving an un-walk-in control signal that instructs the seat to be controlled in the un-walk-in angle area mode through the input part, the instructions may be configured to, when being executed by the controller, cause the seat control apparatus to maintain a fastening state of the fixing part that fixes the slide location of the seat by the first driving part, and control the reclining angle of the seat to the un-walk-in angle area by using the second driving part.

According to an embodiment, the input part may include a first switch disposed in one area of a backrest of the seat, and a second switch disposed in one area of a side cushion of the seat, and the instructions may be configured to, when being executed by the controller, cause the seat control apparatus to, when an input to the first switch, which exceeds a first time period, is received, activate an operation mode control of the seat, and when an input to the second switch, which exceeds a second time period that is shorter than a first time period, is received, activate the operation mode control of the seat.

According to an embodiment, the seat control apparatus may further include a rear seat passenger detecting sensor, the instructions may be configured to, when being executed by the controller, cause the seat control apparatus to, when it is identified that a user is present in a rear seat of the seat by using the rear seat passenger detecting sensor, increase an input maintenance requiring time period of the user input to the input part.

According to an aspect of the present disclosure, a seat control method includes: receiving, by a controller, a user input on a walk-in mode, through an input part; and based on the received user input, controlling, by the controller, a slide location of a seat to a walk-in location area corresponding to the walk-in mode by using a first driving part and controlling, by the controller, a reclining angle of the seat to a walk-in angle area corresponding to the walk-in mode by using a second driving part. The seat control method further includes: upon receiving the user input again through the input part, restoring, by the controller, the reclining angle of the seat from the walk-in angle area to an un-walk-in angle area by using the second driving part.

According to an embodiment, the first driving part may include a fixing part that locks the seat to an un-walk-in location area corresponding to an un-walk-in angle area mode, and the second driving part may include a motor.

According to an embodiment, the controlling of the slide location of the seat to the walk-in location area may include: activating, by the controller, an actuator included in the fixing part based on the received user input to unfasten the seat and the fixing part; generating a repulsive force of a spring by unfastening the fixing part; and moving the seat by the generated repulsive force to one point included in the walk-in location area on a front side of a current location.

According to an embodiment, the controlling of the reclining angle of the seat to the walk-in angle area may include: controlling, by the controller, the reclining angle of the seat to the walk-in angle area including a front area of the seat by using a motor.

According to an embodiment, the seat control method may further include: identifying a previous operation mode of the seat; and in response to identifying that the previous operation mode is an un-walk-in angle area mode, controlling the seat to the walk-in mode by using the first driving part and the second driving part. The seat control method may further include: in response to identifying that the previous operation mode is the walk-in mode, controlling the side location of the seat to an un-walk-in location area corresponding to the un-walk-in angle area mode by using the first driving part and controlling the reclining angle of the seat to the un-walk-in angle area corresponding to the un-walk-in angle area mode by using the second driving part.

According to an embodiment, the seat control method may further include identifying, by the controller, a seat operation state including at least one of the slide location of the seat, the reclining angle of the seat, and any combination thereof by using the seat position sensor, and controlling, by the controller, an operation mode of the seat to the walk-in mode or the un-walk-in angle area mode through the first driving part or the second driving part, based on the seat operation state.

According to an embodiment, the seat control method may further include: identifying, by the controller, the reclining angle of the seat by using at least one Hall sensor; and in response to determining that the reclining angle is included in the walk-in angle area, changing, by the controller, the previous operation mode of the seat to an un-walk-in angle mode.

According to an embodiment, the seat control method may further include: upon receiving a walk-in control signal that instructs the slide location of the seat to be controlled to the walk-in mode through the input part, controlling, by the controller, the slide location of the seat to the walk-in location area by using the first driving part and controlling the reclining angle of the seat to the walk-in angle area by using the second driving part. the seat control method may further include: upon receiving an un-walk-in control signal that instructs the seat to be controlled to an un-walk-in angle area mode through the input part, maintaining, by the controller, a fastening state of the fixing part that fixes the slide location of the seat by the first driving part, and controlling the reclining angle of the seat to the un-walk-in angle area by using the second driving part.

According to an embodiment, the input part may include a first switch disposed in one area of a backrest of the seat, and a second switch disposed in one area of a side cushion of the seat, and the seat control method may further include activating, by the controller, an operation mode control of the seat when receiving an input to the first switch, which exceeds a first time period, and activating the operation mode control of the seat when receiving an input to the second switch, which exceeds a second time period that is shorter than the first time period.

According to an embodiment, the seat control method may further include increasing, by the controller, an input maintenance requiring time period of the user input to the input part when it is identified that a user is present in a rear seat of the seat by using a rear seat passenger detecting sensor.

BRIEF DESCRIPTION OF THE DRAWINGS

The above and other objects, features and advantages of the present disclosure should be more apparent from the following detailed description taken in conjunction with the accompanying drawings.

In relation to the description of the drawings, the same or similar components may be denoted by the same or similar reference numerals.

DETAILED DESCRIPTION

Figure 1:
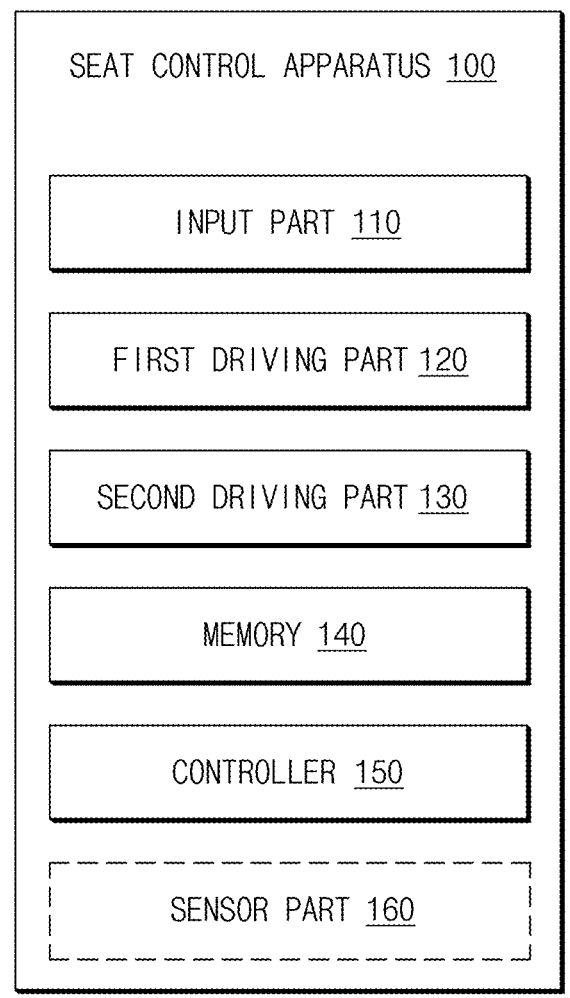
FIG. 1 is a block diagram illustrating components of a seat control apparatus according to an embodiment of the present disclosure.

Hereinafter, embodiments of the present disclosure are described in detail with reference to the accompanying drawings. In adding reference numerals to the components of the drawings, it is noted that the same components are denoted by the same reference numerals even when they are drawn in different drawings. Furthermore, in describing the embodiments of the present disclosure, when it is determined that a detailed description of related known configurations and functions may hinder understanding of the embodiments of the present disclosure, a detailed description thereof has been omitted.

Furthermore, in describing the components of the embodiments of the present disclosure. terms, such as first, second, "A", "B", (a), and (b) may be used. The terms are simply for distinguishing the components, and the essence, the sequence, and the order of the corresponding components are not limited by the terms. Furthermore, unless otherwise defined, all terms, including technical and scientific terms, used herein have the same meaning as commonly understood by those skilled in the art to which the present disclosure pertains. It should be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

When a component, device, element, or the like of the present disclosure is described as having a purpose or performing an operation, function, or the like, the component, device, or element should be considered herein as being "configured to" meet that purpose or to perform that operation or function.

Hereinafter, embodiments of the present disclosure are described in detail with reference to FIGS. 1 to 8.

FIG. 1 is a block diagram illustrating components of a seat control apparatus according to an embodiment of the present disclosure.

According to an embodiment, a seat control apparatus 100 may include at least one of an input part 110, a first driving part 120, a second driving part 130, a memory 140, a controller 150, a sensor part 160, or any combination thereof. The components of the seat control apparatus 100 illustrated in FIG. 1 are exemplary, and the embodiments of the present disclosure are not limited thereto. In another embodiment, the seat control apparatus 100 may further include components (e.g., at least one of a memory, an interface part, a communication part, a display part, or any combination thereof) that are not illustrated in FIG. 1.

According to an embodiment, the input part 110 may include at least one switch.

In an embodiment, the input part 110 may include at least one switch that is provided in one area of the seat. The one area, as an example, may include one area of a backrest of a seat and/or one area of a side cushion of the seat.

For example, the input part 110 may include a first switch that is disposed on the one area of the backrest of the seat, and a second switch that is disposed in the one area of the side cushion of the seat.

In an embodiment, when an input to the first switch, which exceeds a first time period, is received, an operation mode control of the seat may be activated. In other words, only when the input to the switch, which exceeds the first time period, is received, the controller 150 may identify that a user input on a change in an operation mode of the seat is received.

In an embodiment, when an input to the second switch, which exceeds a second time period, is input, the operation mode control of the seat may be activated. In other words, only when the input to the second switch, which exceeds the second time period, is received, the controller 150 may identify that the user input on the change in the operation mode of the seat is received. The second time period, for example, may be shorter than the first time period. In other words, an input maintenance requiring time period for the second switch may shorter than that for the first switch.

In an embodiment, the input part 110 may deliver a user input based on a touch input delivered from a user to the controller 150. For example, when the touch input to the input part 110 exceeds a specific time period (or an input maintenance requiring time period), the controller 150 may recognize (or identify) the corresponding touch input as a user input.

In an embodiment, the input part 110 may change the above-described specific time period according to a control by the controller 150. As an example, the controller 150 may increase the input maintenance requiring time period when a user is present on a rear seat of a target seat that is to be controlled. In other words, when the user is present on the rear seat, the controller 150 may increase the input maintenance requiring time period such that a touch input has to be applied to the input part 110 by the user for a relatively long time period to change the mode of the seat.

According to an embodiment, the first driving part 120 may include at least one driving device that controls the slide location of the seat.

In an embodiment, the first driving part 120 may include a fixing part. The first driving part 120, for example, may fix a portion of the seat to one point of an un-walk-in location area (also, may referred to as a non-walk-in-location area) corresponding to an un-walk-in angle area mode by using the fixing part. Through this, the slide location of the seat may be fixed to the one point of the un-walk-in location area.

In an embodiment, the first driving part 120 may include an actuator. The controller 150, for example, may unfix (or unfasten) the seat through the fixing part by activating (or operating) the actuator to control the slide location of the seat to the walk-in location area corresponding to the walk-in mode. Through this, the fixing of the seat to the above-described one point may be released (or the seat and the fixing part may be unfixed), and thus, the seat may be moved forwards. In other words, the seat may be moved to one point (e.g., one point included in the walk-in location area) on a front side of a current location of the seat by a repulsive force of a spring, which is generated as the fixing part is unfastened.

According to an embodiment, the second driving part 130 may include at least one motor that controls a reclining angle of the seat.

In an embodiment, the second driving part 130 may include a motor. The second driving part 130, for example, may control the reclining angle of the seat to a specific angle. Through this, the reclining angle of the seat may be changed to the walk-in angle area corresponding to the walk-in mode or the un-walk-in angle area corresponding to the un-walk-in angle area mode.

In an embodiment, when the seat is viewed from a lateral side, the un-walk-in angle area may include an area on a rear side of the walk-in angle area. In other words, the un-walk-in angle area may be an area, in which the backrest of the seat is present on a rear side of the walk-in angle area.

In an embodiment, a seat can be categorized as a semi-power seat when its slide location is mechanically locked and controlled not by a motor but through mechanical locking, while the reclining angle is adjusted through a motor. The semi-power seat may include an algorithm, by which a portion thereof is mechanically locked (or fastened) through the fixing part and is fixed to one point (e.g., one point of the un-walk-in location area, the actuator is operated to unfasten the fixing part when the mode has to be changed to the walk-in mode based on a user input, and the seat is move d to one point (e.g., one point of the walk-in location area) on a front side by a repulsive force through the spring.

According to an embodiment, the memory 140 may store instructions or data. For example, the memory 140 may store one or more instructions that, when being executed by the controller 150, cause the seat control apparatus 100 to perform various operations.

For example, the memory 140 may be implemented by the controller 150 and one chipset. The controller 150 may include at least one of a communication processor or a modem.

According to an embodiment, the controller 150 may be operatively connected to at least one of the input part 110, the first driving part 120, the second driving part 130, the memory 140, the sensor part 160, or any combination thereof. For example, the controller 150 may control an operation of at least one of the input part 110, the first driving part 120, the second driving part 130, the memory 140, the sensor part 160, or any combination thereof.

For example, the controller 150 may receive a user input on the walk-in mode, through the input part 110.

In an embodiment, the controller 150 may adjust an input maintenance requiring time period of at least one switch included in the input part 110. The controller 150 may increase the input maintenance requiring time period of the user input to the input part 110, when it is identified that a user is present in the rear seat of the target seat by using the rear seat passenger detecting sensor included in the sensor part 160, and thus, may identify that the user input is received only when the input to the input part 110 is maintained for a time period that exceeds the increased input maintenance requiring time period.

In an embodiment, the user input may include a user input on the walk-in mode (a change in the operation mode to the walk-in mode or the un-walk-in angle area mode).

For example, the controller 150 may control a location of the seat based on the received user input.

In an embodiment, the controller 150 may control the slide location of the seat to the walk-in location area corresponding to the walk-in mode by using the first driving part 120, and may control the reclining angle of the seat to the walk-in angle area corresponding to the walk-in mode by using the second driving part 130. The controller 150 may unfasten the fixing part by operating the actuator included in the first driving part 120 whereby the slide location of the seat is moved from an existing area to a front area (e.g., the walk-in location area). In one embodiment, the controller 150 may control the reclining angle of the seat to the walk-in angle area including the front area of the seat by using the motor included in the second driving part 130. In this case, the seat is positioned at a location according to the un-walk-in angle area mode before the user input is received. In other words, when the seat is positioned at a location according to the walk-in mode before the user input is received, the controller 150 may control the seat to the area corresponding to the un-walk-in angle area mode by using the first driving part 120 and the second driving part 130.

In an embodiment, the controller 150 may restore the reclining angle of the seat from the walk-in angle area to the un-walk-in angle area by using the second driving part 130 when the user input is received again through the input part 110. In other words, the controller 150 may control the seat to the location according to the walk-in mode in response to the received user input including the intention of the change to the initial walk-in mode and then may receive the user input again through the input part 110. In this case, the controller 150 may restore (or control) the reclining angle of the seat to the un-walk-in angle area by using the second driving part 130, and may not deliver a control command to the first driving part 120 (or may not operate the first driving part 120).

In an embodiment, the controller 150 may perform a seat control corresponding to the user input after identifying the previous operation mode of the seat. The controller 150, for example, may identify the previous operation mode of the seat, through the sensor part 160 or based on an operation history of the seat, which is stored in the memory 140 in advance.

In an embodiment, the controller 150 may control the seat to the walk-in mode by using the first driving part 120 and the second driving part 130 when the identified previous operation mode is in the un-walk-in angle area mode that is opposite to the walk-in mode. A description of the embodiment of controlling the seat to the walk-in mode may be replaced by the description of the operation of the controller 150.

In an embodiment, when the identified previous operation mode is the walk-in mode, the controller 150 may control the slide location of the seat to the un-walk-in location area corresponding to the un-walk-in angle area mode by using the first driving part 120 and may control the reclining angle of the seat to the un-walk-in angle area corresponding to the un-walk-in angle area mode by using the second driving part 130. Then, the operation using the first driving part 120 may include an operation of fastening the seat such that a portion of the seat is fixed to one point of the un-walk-in location area by using the fixing part included in the first driving part 120.

In one embodiment, the controller 150 may identify an operation state (e.g., at least one of the slide location, the reclining angle, or any combination thereof) of the seat by using the seat position sensor. The controller 150 may control the operation mode of the seat to the walk-in mode or the un-walk-in angle area mode through the first driving part 120 and the second driving part 130 based on the identified operation state.

In an embodiment, the controller 150 may identify the reclining angle by using at least one Hall sensor. The controller 150 may change (or set) and store the previous operation mode of the seat, which is stored in the memory 140, based on the area including the identified reclining angle. As an example, when the identified reclining angle is included in the walk-in angle area, the controller 150 may change (or set) the previous operation mode of the seat, which is stored in the memory 140, to the walk-in mode. As another example, when the identified reclining angle is included in the un-walk-in angle area, the controller 150 may change (or set) the previous operation mode of the seat, which is stored in the memory 140, to the un-walk-in angle area mode.

In an embodiment, the controller 150 may receive an un-walk-in control signal or an un-walk-in control signal that controls the seat to the walk-in mode or the un-walk-in angle area mode, from the input part 110. In other words, when receiving a user input from the user, the input part 110 may identify whether the corresponding user input is a request for changing the seat to the un-walk-in angle area mode or to the walk-in mode, and then may deliver the identified control signal to the controller 150.

In an embodiment, upon receiving a walk-in control signal that instructs the seat to be controlled to the walk-in mode through the input part 110, the controller 150 may control the slide location of the seat to the walk-in location area by using the first driving part 120 and may control the reclining angle of the seat to the walk-in angle area by using the second driving part 130.

In an embodiment, upon receiving the un-walk-in control signal that instructs the seat to be controlled to the un-walk-in angle area mode through the input part 110, the controller 150 may maintain the fastening state of the fixing part that fixes the slide location of the seat by using the first driving part 120 and may control the reclining angle of the seat to the un-walk-in angle area by using the second driving area 130. In other words, upon receiving the un-walk-in control signal, the controller 150 may not deliver a control signal to the first driving part 120 (or the actuator included in the first driving part 120) to maintain the fixing state of the un-walk-in location area of the seat by using the first driving part 120.

According to an embodiment, the sensor part 160 may acquire information for controlling the seat by using various types of sensors.

In an embodiment, the sensor part 160 may include at least one of the seat position sensor, at least one Hall sensor, the rear seat passenger detecting sensor, or any combination thereof.

In an embodiment, the rear seat passenger detecting sensor may identify whether a user is seated on the rear seat (or a user corresponding to the rear seat is present), by detecting (e.g., detecting a weight of) a seat mat of the rear seat, which is present on a rear side of the seat that is to be controlled by the controller 150.

In an embodiment, the rear seat passenger detecting sensor may identify whether the user is seated on the rear seat (or a user corresponding to the rear seat is present) based on whether a safety corresponding to the rear seat is fastened.

In an embodiment, the rear seat passenger detecting sensor may identify whether the user is seated on the rear seat (or a user corresponding to the rear seat is present) based on at least one of a camera, a rear occupant alert (ROA) system, or any combination thereof.

Hereinafter, FIGS. 2A, 2B, and 2C may relate to embodiments regarding at least one of an operation algorithm between various components of the seat control apparatus 100, which may be implemented, and/or disposition or presence of the components, or any combination thereof.

Figure 2A:
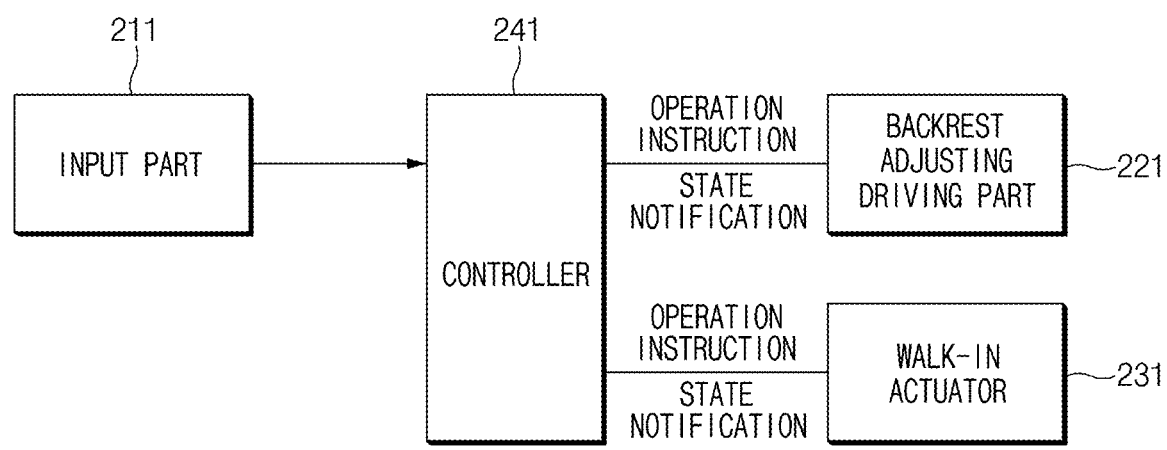
FIG. 2A is a block diagram illustrating components of a seat control apparatus according to an embodiment of the present disclosure.

FIG. 2A is a block diagram illustrating the components of the seat control apparatus according to an embodiment of the present disclosure.

Referring to FIG. 2A, according to an embodiment, the seat control apparatus (e.g., the seat control apparatus 100 of FIG. 1) may include an input part 211 (e.g., the input part 110 of FIG. 1), a controller 241 (e.g., the controller 150 of FIG. 1), a backrest adjusting driving part 221 (e.g., the second driving part 130 of FIG. 1), and/or a walk-in actuator 231 (e.g., the first driving part 120 of FIG. 1).

Referring to FIG. 2A, as an embodiment, the controller 241 directly identifies an operation mode for controlling the seat and delivers a control signal (or an operation instruction) to the backrest adjusting driving part 221 and/or the walk-in actuator 231 when a user input is received through the input part 211.

For example, the controller 241 may directly identify an operation mode corresponding to a user input based on at least one of information on an operation of the seat, which is acquired through the sensor part (e.g., the sensor part 160 of FIG. 1), an operation history of the seat, which is stored in the memory (e.g., the memory 140 of FIG. 1), or any combination thereof. Then, the controller 241 may deliver a control signal generated based on the identified operation mode to the backrest adjusting driving part 221 and/or the walk-in actuator 231. The controller 241 may receive information (e.g., a state notification) on an operation state of the backrest adjusting driving part 221 and/or the walk-in actuator 231, and may store at least a portion of the received information in the memory.

Figure 2B:
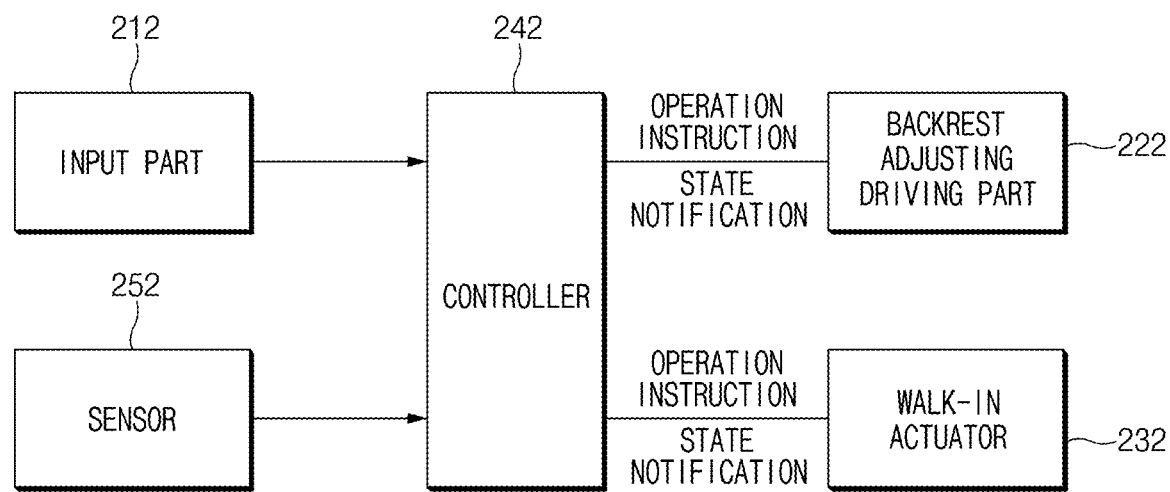
FIG. 2B is a block diagram illustrating components of a seat control apparatus according to an embodiment of the present disclosure.

FIG. 2B is a block diagram illustrating the components of the seat control apparatus according to an embodiment of the present disclosure.

Referring to FIG. 2B, according to an embodiment, the seat control apparatus (e.g., the seat control apparatus 100 of FIG. 1) may include an input part 212 (e.g., the input part 110 of FIG. 1), a controller 242 (e.g., the controller 150 of FIG. 1), a sensor 252 (e.g., the sensor part 160 of FIG. 1), a backrest adjusting driving part 222 (e.g., the second driving part 130 of FIG. 1), and/or a walk-in actuator 232 (e.g., the first driving part 120 of FIG. 1).

As illustrated in FIG. 2B, as an embodiment, the controller 242 identifies an operation mode for controlling the seat based on information on an operation state of the seat, which is acquired by using the sensor 252 (e.g., the sensor part 160 of FIG. 1) and delivers a control signal (or an operation instruction) to the backrest adjusting driving part 222 and/or the walk-in actuator 232 when a user input is received through the input part 212.

For example, the controller 242 may identify a seat operation mode shortly before a user input is received, by using the sensor 252 including the seat position sensor, may generate a control signal for controlling the seat in an opposite mode to the identified operation mode, and may deliver the generated control signal to the backrest adjusting driving part 222 and/or the walk-in actuator 232. The controller 242 may receive information (e.g., a state notification) on an operation state from the backrest adjusting driving part 222 and/or the walk-in actuator 232, and may store at least a portion of the received information in the memory.

Figure 2C:
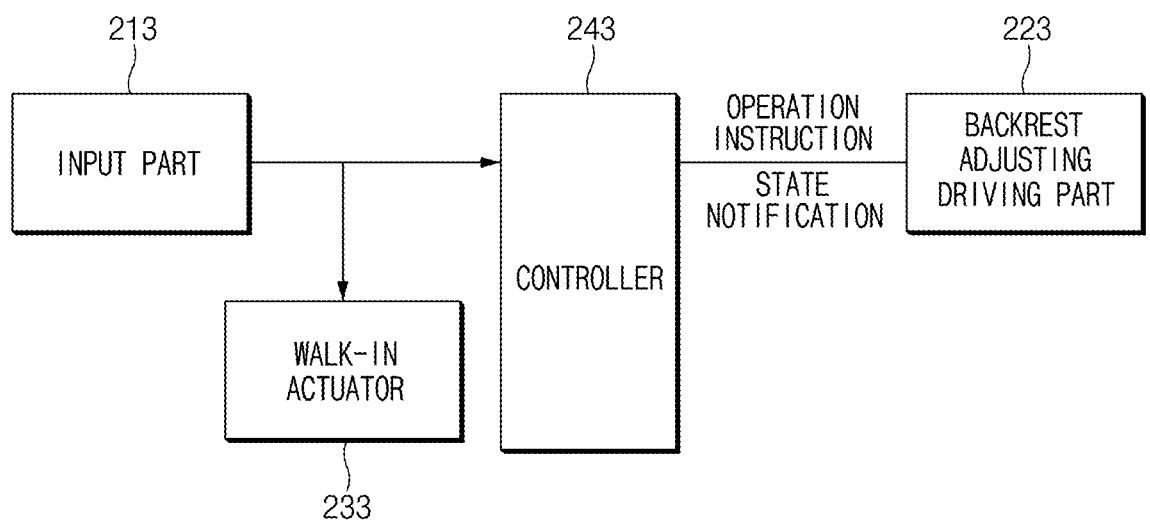
FIG. 2C is a block diagram illustrating components of a seat control apparatus according to an embodiment of the present disclosure.

FIG. 2C is a block diagram illustrating the components of the seat control apparatus according to an embodiment of the present disclosure.

Referring to FIG. 2C, according to an embodiment, the seat control apparatus (e.g., the seat control apparatus 100 of FIG. 1) may include an input part 213 (e.g., the input part 110 of FIG. 1), a controller 243 (e.g., the controller 150 of FIG. 1), a backrest adjusting driving part 223 (e.g., the second driving part 130 of FIG. 1), and/or a walk-in actuator 233 (e.g., the first driving part 120 of FIG. 1).

As illustrated in FIG. 2C, as an embodiment, the controller 243 and/or the walk-in actuator 233 continuously counts the number of user inputs to the input part 213, and identifies an operation mode for controlling the seat based on the counting result to control an operation mode of the seat when a user input is received through the input part 213.

For example, when a user input is received through the input part 213, the controller 241 may identify an operation mode corresponding to the user input and may deliver a control signal generated based on the identified operation mode to the backrest adjusting driving part 223.

In an embodiment, when a user input is received through the input part 213, the walk-in actuator 233 may continuously count the number of user inputs and may make a request for a control signal for an operation to the controller 243 when it is determined that an operation of the actuator is necessary, based on the counting result. The walk-in actuator 233 may unfasten the fixing part, which has fixed the slide location of the seat, based on the control signal received from the controller 243, in response to the request. The controller 243 may receive information (e.g., a state notification) on an operation state from the backrest adjusting driving part 223 and/or the walk-in actuator 233, and may store at least a portion of the received information in the memory.

Figure 3:
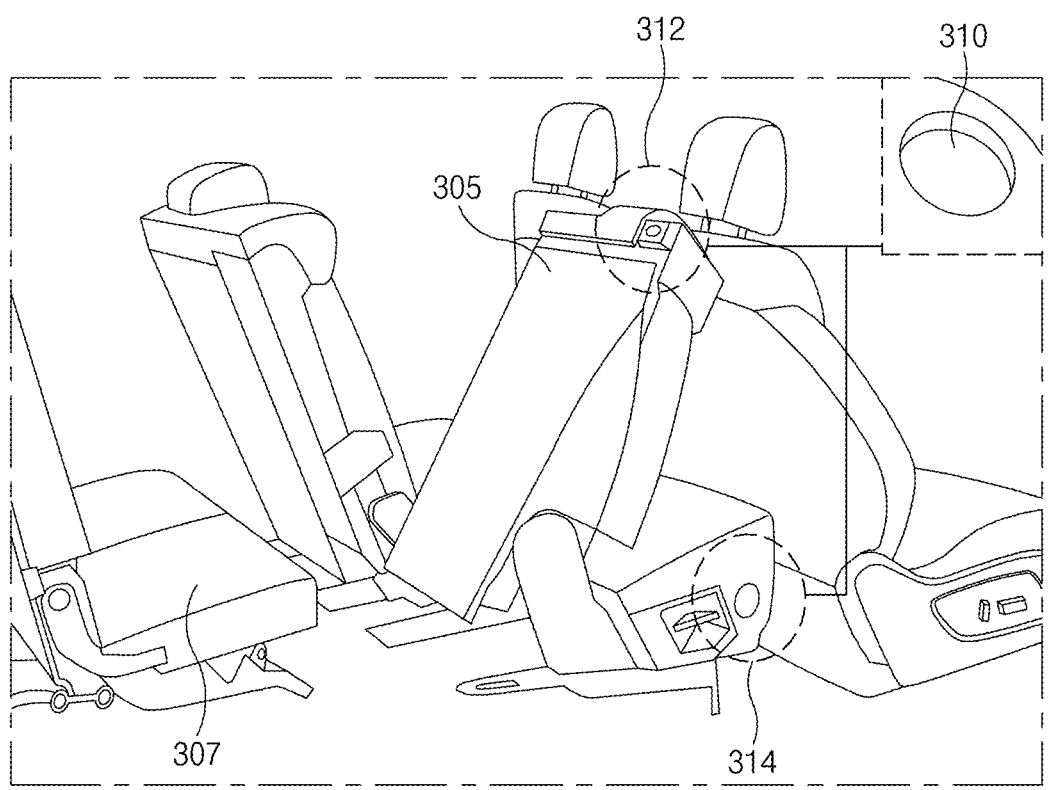
FIG. 3 is a conceptual view of an operation of a seat control apparatus according to an embodiment of the present disclosure.

FIG. 3 is a conceptual view of an operation of the seat control apparatus according to an embodiment of the present disclosure.

According to an embodiment, the seat control apparatus (e.g., the seat control apparatus 100 of FIG. 1) may control an operation mode of the seat 305 that is to be controlled to the walk-in mode or the un-walk-in angle area mode.

For example, the seat control apparatus may control the seat to the walk-in mode (e.g., the operation mode illustrated in FIG. 3) based on the received user input to the input part 310 (e.g., the input part 110 of FIG. 1). In this case, a previous operation mode of the seat 305, which is an operation mode shortly before the user input is received, may correspond to the un-walk-in angle area mode.

In an embodiment, the input part 310 may include a first switch and a second switch that are disposed in a first area 312 included in the backrest of the seat 305 and a second area 314 included in the side cushion of the seat 305, respectively.

In an embodiment, input maintenance requiring time periods of the first switch and the second switch may be different. In other words, the seat control apparatus may activate the operation mode control of the seat only when an input to the first switch, which exceeds a first time period, is received, and may activate the operation mode control of the seat only when an input to the second switch, which exceeds a second time period, is received. The second time period is shorter than the first time period. The first time period and the second time period may be input maintenance requiring time periods for the first switch and the second switch.

For example, because the seat is controlled based on the walk-in mode, the user who is to be seated on a rear seat 307 may be conveniently moved to the rear seat 307.

Figure 4:
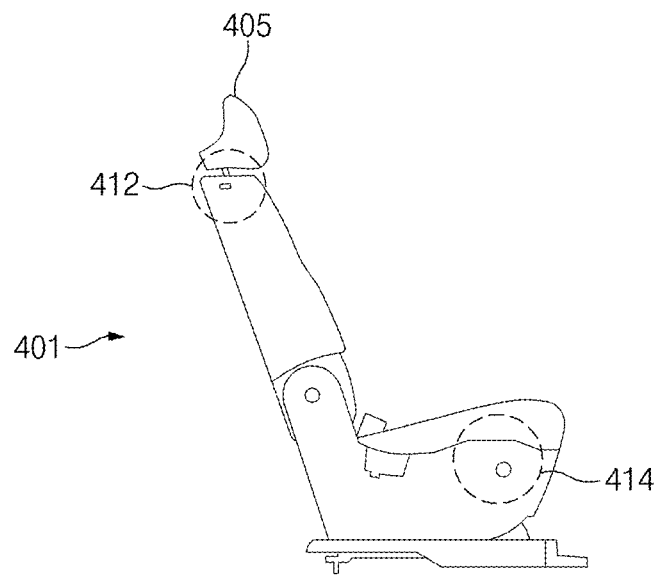
FIG. 4 is a conceptual view of an operation of a seat control apparatus according to an embodiment of the present disclosure.
Figure 4:
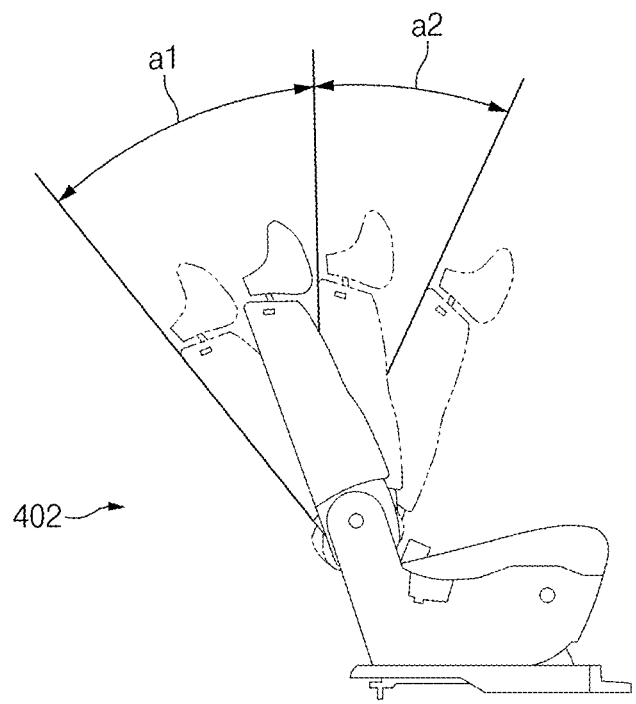

FIG. 4 is a conceptual view of an operation of the seat control apparatus according to an embodiment of the present disclosure.

Referring to reference numeral 401, according to an embodiment, the seat control apparatus (e.g., the seat control apparatus 100 of FIG. 1) may receive a user input from the user through input parts 412 and 424.

For example, an input (e.g., a touch input) is sent to the first switch, which is disposed in a first area 412 included in the backrest of a seat 405, and/or a second switch included in a second area 414 of the side cushion. When the input exceeds an input maintenance requiring time period, the seat control apparatus may identify that the user input is received.

Referring to reference numeral 402, according to an embodiment, the seat control apparatus may adjust the reclining angle of the seat by using the driving part (e.g., the second driving part 130 of FIG. 1).

For example, when the seat is in the un-walk-in angle area mode before the user input is received, the seat control apparatus may control the reclining angle of the seat to a walk-in angle area "a2" corresponding to the walk-in mode in response to the received user input.

For example, when the seat is in the walk-in mode before the user input is received, the seat control apparatus may control the reclining angle of the seat to an un-walk-in angle area "a1" corresponding to the un-walk-in angle area mode in response to the received user input.

Figure 5:
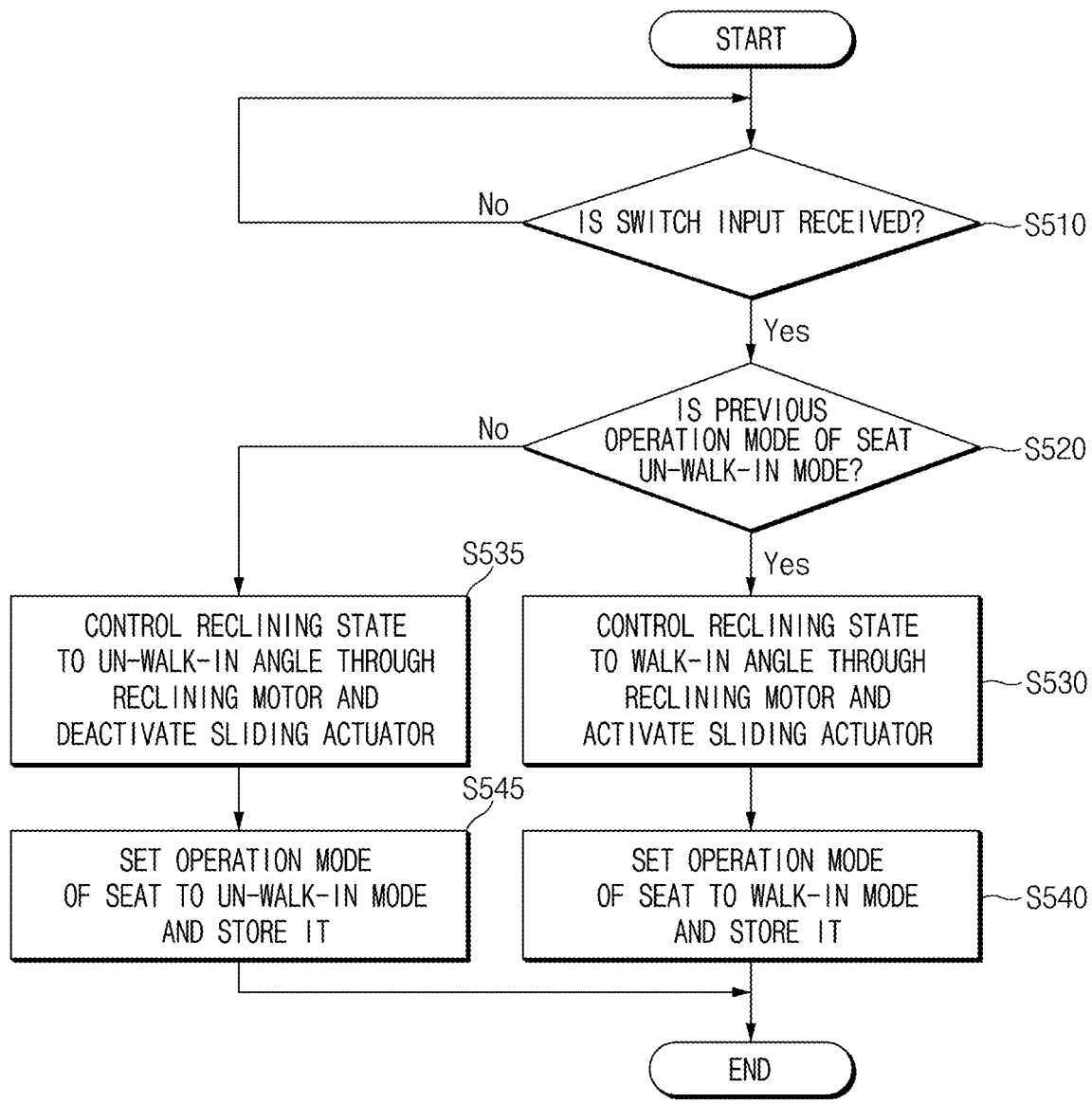
FIG. 5 is a flowchart of a seat control method according to an embodiment of the present disclosure.

FIG. 5 is a flowchart of a seat control method according to an embodiment of the present disclosure.

According to an embodiment, the seat control apparatus (e.g., the seat control apparatus 100 of FIG. 1) may perform operations disclosed in FIG. 5. For example, at least some of the components (e.g., the input part 110, the first driving part 120, the second driving part 130, the memory 140, the controller 150, and the sensor part 160 of FIG. 1) included in the seat control apparatus may be configured to perform the operations of FIG. 5.

Hereinafter, in the embodiment, operations of S510 to S545 may be sequentially performed, but are not necessarily sequentially performed. For example, the sequence of the operations may be changed, and at least two operations may be performed in parallel. Furthermore, the contents corresponding to the contents described above in relation to FIG. 5 or the repeated contents are briefly described or omitted.

According to an embodiment, the seat control apparatus may identify whether a switch input is received (S510).

For example, the seat control apparatus may identify whether an input to a switch, which exceeds an input maintenance requiring time period, is received.

For example, when the input to the switch, which exceeds the input maintenance requiring time period, is received (e.g., operation S510—Yes), the seat control apparatus may perform operation S520.

For example, when an input to a switch, which exceeds an input maintenance requiring time period, is not received (e.g., operation S510—No), the seat control apparatus may repeatedly perform operation S510.

According to an embodiment, the seat control apparatus may identify whether the previous operation mode of the seat is the un-walk-in angle area mode (S520).

For example, the seat control apparatus may identify whether the previous operation mode of the seat before a user input is received is the un-walk-in angle area mode by using at least one of the information acquired through the sensor part, the information stored in the memory, or any combination thereof.

For example, when the previous operation mode of the seat is the un-walk-in angle area mode (e.g., operation S520—Yes), the seat control apparatus may perform operation S530.

For example, when the previous operation mode of the seat is not the un-walk-in angle area mode 9 or when the previous operation mode of the seat is the walk-in mode0 (e.g., operation S520—No), the seat control apparatus may perform operation S535.

According to an embodiment, the seat control apparatus may control a reclining state to a walk-in angle through a reclining motor, and may activate the actuator (S530).

For example, the seat control apparatus may change the operation mode of the seat to the walk-in mode by adjusting the reclining angle of the seat to the walk-in angle area corresponding to the walk-in mode by using the reclining motor (e.g., the second driving part 130 of FIG. 1) and activating a sliding actuator (e.g., the first driving part 120 of FIG. 1) to unfix the seat and move the seat forwards.

According to an embodiment, the seat control apparatus may set the operation mode of the seat to the walk-in mode and store it in the memory.

For example, the seat control apparatus may set the recent operation mode of the seat to the walk-in mode, and may store the set operation history in the memory. The operation mode stored in operation S540 may be recognized as the previous operation mode when a user input is received later again.

According to an embodiment, the seat control apparatus may control the reclining state to the un-walk-in angle through the reclining motor and may activate the sliding actuator (S535).

For example, the seat control apparatus may change the operation mode of the seat to the un-walk-in angle area mode by adjusting the reclining angle of the seat to the un-walk-in angle area corresponding to the un-walk-in angle area mode by using the reclining motor and deactivating the sliding actuator (e.g., the first driving part 120 of FIG. 1) to fix the seat to at least one point of the un-walk-in location area.

According to an embodiment, the seat control apparatus may set the operation mode of the seat to the un-walk-in angle area mode and may store it in the memory (S545).

For example, the seat control apparatus may set the recent operation mode of the seat to the un-walk-in angle area mode, and may store the set operation history in the memory. The operation mode stored in operation S545 may be recognized as the previous operation mode when a user input is received later again.

Figure 6:
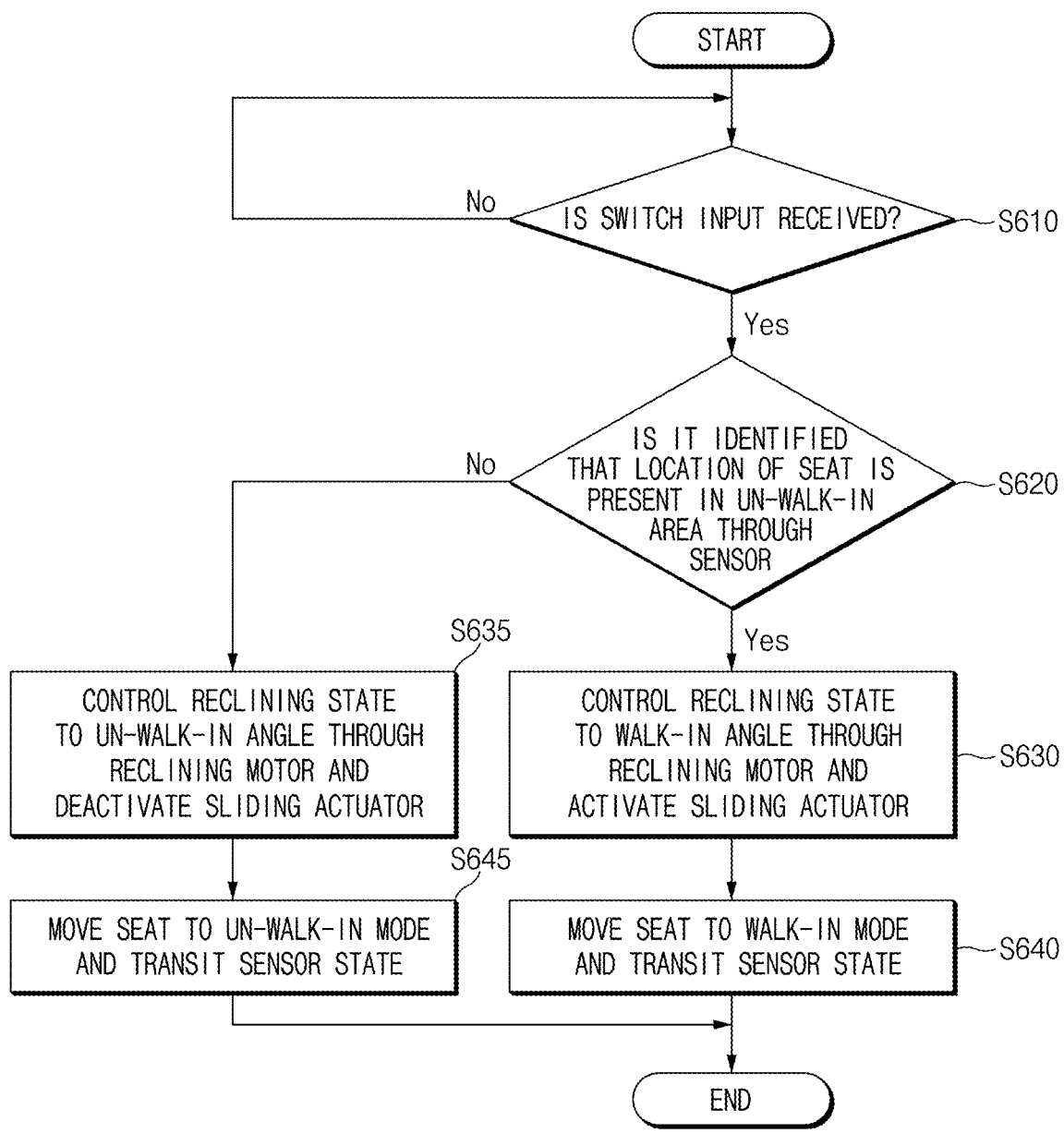
FIG. 6 is a flowchart of a seat control method according to an embodiment of the present disclosure.

FIG. 6 is a flowchart of a seat control method according to an embodiment of the present disclosure.

According to an embodiment, the seat control apparatus (e.g., the seat control apparatus 100 of FIG. 1) may perform operations disclosed in FIG. 6. For example, the components (e.g., the input part 110, the first driving part 120, the second driving part 130, the memory 140, the controller 150, and the sensor part 160 of FIG. 1) included in the seat control apparatus may be configured to perform the operations of FIG. 6.

Hereinafter, in the embodiment, the operations of S610 to S645 may be sequentially performed, but do not need to be sequentially performed. For example, the sequence of the operations may be changed, and at least two operations may be performed in parallel. Furthermore, the contents corresponding to the contents described above in relation to FIG. 6 or a repeated description thereof is briefly described or omitted.

According to an embodiment, the seat control apparatus may identify whether a switch input is received (S610).

For example, the seat control apparatus may identify whether an input to the switch, which exceeds an input maintenance requiring time period, is received.

When the input to the switch, which exceeds the input maintenance requiring time period, is received (e.g., operation S610—Yes), the seat control apparatus may perform operation S620.

When the input to the switch, which exceeds the input maintenance requiring time period, is not received (e.g., operation S610—No), the seat control apparatus may perform operation S610 repeatedly.

According to an embodiment, the seat control apparatus may identify whether a location of the seat is present in the un-walk-in area, through a sensor.

In one embodiment, the seat control apparatus may identify whether the reclining angle and/or the slide location of the seat is present in an area corresponding to the un-walk-in angle area mode by using the seat position sensor.

When it is identified that the location of the seat is present in the un-walk-in area (e.g., operation S620—Yes), the seat control apparatus may perform operation S630.

When it is identified that the location of the seat is not present in the un-walk-in area (or when it is identified that the location of the seat is present in the walk-in area) (e.g., operation S620—No), the seat control apparatus may perform operation S635.

According to an embodiment, the seat control apparatus may control the reclining state to the walk-in angle through the reclining motor, and may activate the sliding actuator (S630).

In one embodiment, the seat control apparatus may change the operation mode of the seat to the walk-in mode by adjusting the reclining angle of the seat to the walk-in angle area corresponding to the walk-in mode by using the reclining motor (e.g., the second driving part 130 of FIG. 1) and activating a sliding actuator (e.g., the first driving part 120 of FIG. 1) to unfix the seat and move the seat forwards.

According to an embodiment, the seat control apparatus may set the operation mode of the seat to the walk-in mode and may store it in the memory (S640).

In one embodiment, the seat control apparatus may set the recent operation mode of the seat to the walk-in mode, and may store the set operation history in the memory. The operation mode stored in operation S640 may be recognized as the previous operation mode when a user input is received later again.

According to an embodiment, the seat control apparatus may control the reclining state to the un-walk-in angle through the reclining motor and may activate the sliding actuator (S635).

For example, the seat control apparatus may change the operation mode of the seat to the un-walk-in angle area mode by adjusting the reclining angle of the seat to the un-walk-in angle area corresponding to the un-walk-in angle area mode by using the reclining motor and deactivating the sliding actuator (e.g., the first driving part 120 of FIG. 1) to fix the seat to at least one point of the un-walk-in location area.

According to an embodiment, the seat control apparatus may set the operation mode of the seat to the un-walk-in angle area mode and may store it in the memory (S645).

For example, the seat control apparatus may set the recent operation mode of the seat to the un-walk-in angle area mode, and may store the set operation history in the memory. The operation mode stored in operation S645 may be recognized as the previous operation mode when a user input is received later again.

Figure 7:
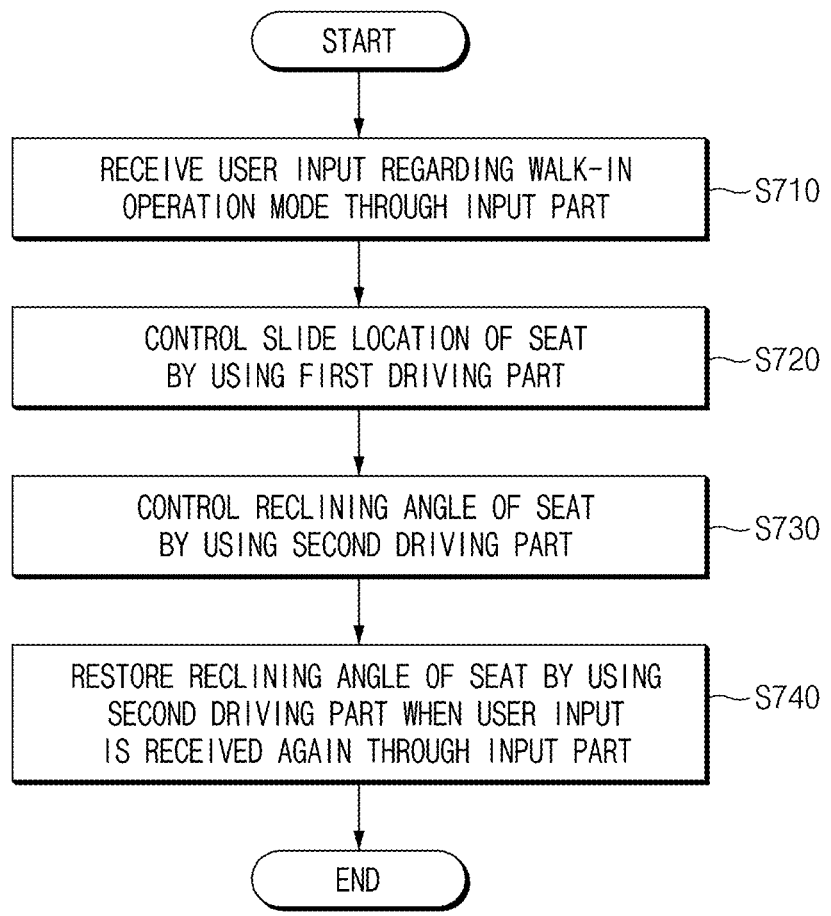
FIG. 7 is a flowchart of a seat control method according to an embodiment of the present disclosure.

FIG. 7 is a flowchart of a seat control method according to an embodiment of the present disclosure.

According to an embodiment, a seat control apparatus (e.g., the seat control apparatus 100 of FIG. 1) may perform operations disclosed in FIG. 7. For example, the components (e.g., the input part 110, the first driving part 120, the second driving part 130, the memory 140, the controller 150, and the sensor part 160 of FIG. 1) included in the seat control apparatus may be configured to perform the operations of FIG. 7.

Hereinafter, in the embodiment, the operations of S710 to S740 may be sequentially performed, but do not need to be sequentially performed. For example, the sequence of the operations may be changed, and at least two operations may be performed in parallel. Furthermore, the contents corresponding to the contents described above in relation to FIG. 7 or a repeated description thereof are briefly described or omitted.

Hereinafter, FIG. 7 is described with a premise that the operation mode of the seat is the un-walk-in angle area mode before a user input is received.

According to an embodiment, the seat control apparatus may receive a user input regarding the walk-in operation mode through the input part.

In one embodiment, the seat control apparatus may identify that a user input is received when an input to the input part, which exceeds an input maintenance requiring time period, is detected. As an example, the seat control apparatus may increase the input maintenance requiring time period for the input part when identifying that a user is present on the rear seat that is present on a rear side of the seat by using the rear seat passenger detecting sensor.

According to an embodiment, the seat control apparatus may control the slide location of the seat by using the first driving part (S720).

For example, the seat control apparatus may control the mode of the seat to the walk-in location area corresponding to the slide walk-in mode of the seat by using the first driving part.

According to an embodiment, the seat control apparatus may control the reclining angle of the seat by using the second driving part.

For example, the seat control apparatus may control the reclining angle of the seat to the walk-in angle area corresponding to the walk-in mode by using the second driving part.

According to an embodiment, the seat control apparatus may restore the reclining angle of the seat by using the second driving part when a user input is received again through the input part.

In one embodiment, the seat control apparatus may restore the reclining angle of the seat by using the second driving part and may not deliver a control signal to the first driving part when a user input is received again after the walk-in mode of the seat is ended in operation S730. Through this, the fixing part of the first driving part may be unfastened. In other words, the slide location of the seat may be controlled to be fixed to one point of the un-walk-in location area by moving the seat to the un-walk-in location area corresponding to the un-walk-in angle area mode and then maintaining a fastened state of the fixing part included in the first driving part.

Figure 8:
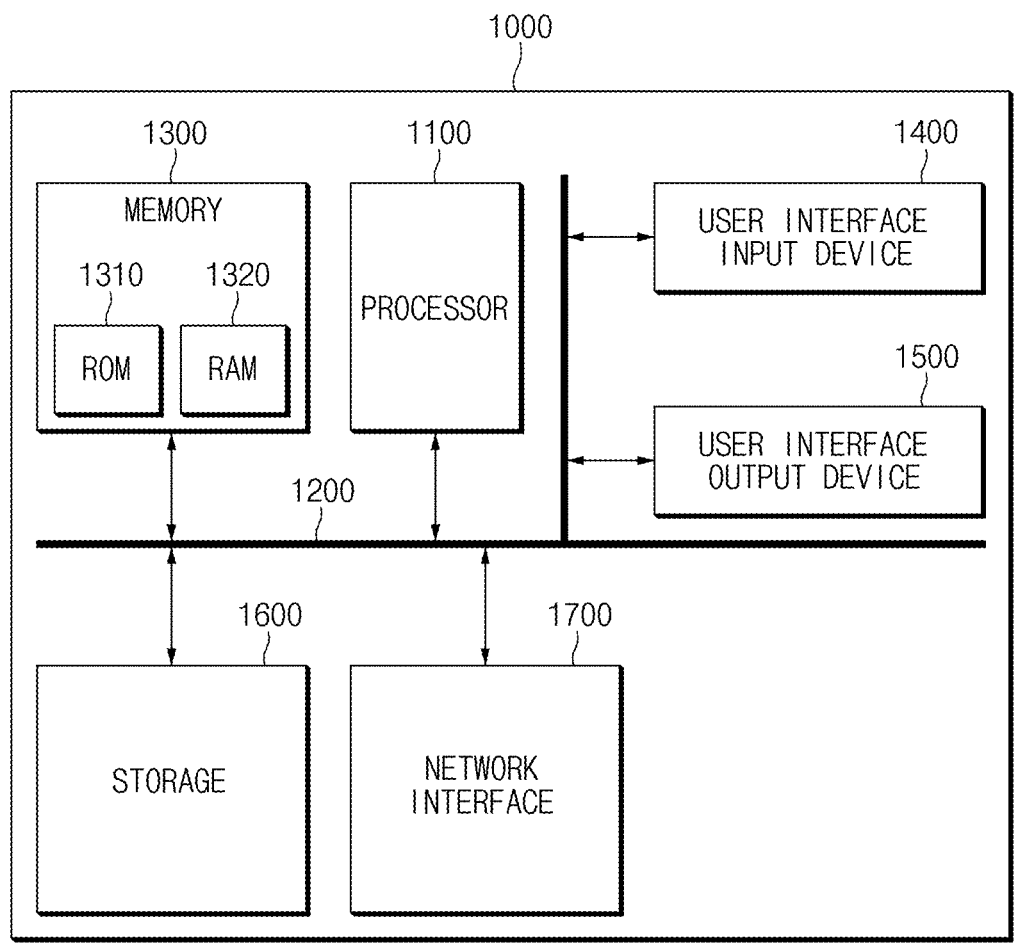
FIG. 8 illustrates a computing system regarding a seat control method according to an embodiment of the present disclosure.

FIG. 8 illustrates a computing system regarding the seat control method according to an embodiment of the present disclosure.

Referring to FIG. 8, a computing system 1000 related to the seat control method may include at least one processor 1100, a memory 1300, a user interface input device 1400, a user interface output device 1500, a storage 1600, and a network interface 1700, which are connected through a bus 1200.

The processor 1100 may be a central processing unit (CPU), or a semiconductor device that processes instructions stored in the memory 1300 and/or the storage 1600. The memory 1300 and the storage 1600 may include various volatile or nonvolatile storage media. For example, the memory 1300 may include a read only memory (ROM) 1310 and a random access memory (RAM) 1320.

Accordingly, the steps of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, a solid state drive (SSD), a detachable disk, or a CD-ROM.

The exemplary storage medium is coupled to the processor 1100, and the processor 1100 may read information from the storage medium and may write information in the storage medium. In another method, the storage medium may be integrated with the processor 1100. The processor 1100 and the storage medium may reside in an application specific integrated circuit (ASIC). The ASIC may reside in a user terminal. In another method, the processor and the storage medium may reside in the user terminal as an individual component.

Effects of the seat control apparatus and the seat control method according to the present disclosure are described as follows.

According to at least one of the embodiments of the present disclosure, the seat control apparatus may prevent discrepancy of operation modes of the driving parts including different types of driving devices in a process of controlling an operation mode of the seat in response to a user input.

Furthermore, according to at least one of the embodiments of the present disclosure, an operation of a driving part for controlling a slide location may not be performed in comprehensive consideration of an operation history of at least one sensor or the controller, a previous operation mode of the seat, and the like when a position of the seat is controlled to a location corresponding to the walk-in mode based on a received user input (e.g., a switch input) regarding a walk-in mode, manually moving a slide location to an un-walk-in location area (or an area on a rear sided of a walk-in location area) by a user, and then receiving a user input again.

Furthermore, according to at least one of the embodiments of the present disclosure, when a walk-in operation is ended, a user manually moves the slide location of the seat to the un-walk-in location area, and then a user input is received again, an operation signal may not be transmitted to the fixing part for controlling the slide location whereby a matching performance of the slide location and the reclining angle according to an operation mode of the seat may be maintained.

In addition, various effects directly or indirectly recognized through the specification may be provided.

Although the present disclosure has been described with reference to the limited embodiments and the drawings in the above description, the above description is simply an exemplary description of the technical spirits of the present disclosure, and an ordinary person in the art, to which the present disclosure pertains, may made various corrections and modifications without departing from the essential characteristics of the present disclosure.

Therefore, the embodiments disclosed in the present disclosure are not for limiting the technical spirits of the present disclosure but for describing them, and the scope of the technical spirits of the present disclosure is not limited by the embodiments. The protection scope of the present disclosure should be construed by the following claims, and all the technical spirits in the equivalent range should be construed as being included in the scope of the present disclosure.

What is claimed is:

1. A seat control apparatus comprising:
an input part disposed in one area of a seat;
a first driving part configured to adjust a slide location of the seat;
a second driving part configured to adjust a reclining angle of the seat;
a memory configured to store one or more instructions; and
a controller operatively connected to the first driving part, the second driving part, and the memory,
wherein the instructions are configured to, when being executed by the controller, cause the seat control apparatus to:
receive a user input on a walk-in mode through the input part;
based on the received user input, control the slide location of the seat to a walk-in location area corresponding to the walk-in mode by using the first driving part, and control the reclining angle of the seat to a walk-in angle area corresponding to the walk-in mode by using the second driving part; and
when the user input is received again through the input part, restore the reclining angle of the seat from the walk-in angle area to an un-walk-in angle area by using the second driving part.

2. The seat control apparatus of claim 1, wherein the first driving part includes a fixing part configured to lock the seat to an un-walk-in location area corresponding to an un-walk-in angle area mode, and
wherein the second driving part includes a motor.

3. The seat control apparatus of claim 2, wherein the instructions are configured to, when being executed by the controller, cause the seat control apparatus to:
unfasten the seat and the fixing part by activating an actuator included in the fixing part based the received user input, and
wherein the seat is configured to be moved to one point included in the walk-in location area on a front side of a current location, by a repulsive force of a spring, which is generated as the fixing part is unfastened.

4. The seat control apparatus of claim 2, wherein the instructions are configured to, when being executed by the controller, cause the seat control apparatus to:
control the reclining angle of the seat to the walk-in angle area including a front area of the seat by using the motor.

5. The seat control apparatus of claim 1, wherein the instructions are configured to, when being executed by the controller, cause the seat control apparatus to:
identify a previous operation mode of the seat,
when the identified previous operation mode is an un-walk-in angle area mode that is opposite to the walk-in mode,
control the seat to the walk-in mode by using the first driving part and the second driving part, and when the identified previous operation mode is the walk-in mode,
control the slide location of the seat to an un-walk-in location area corresponding to the un-walk-in angle area mode by using the first driving part, and control the reclining angle of the seat to the un-walk-in angle area corresponding to the un-walk-in angle area mode by using the second driving part.

6. The seat control apparatus of claim 1, further comprising:
a seat position sensor,
wherein the instructions are configured to, when being executed by the controller, cause the seat control apparatus to:
identify a seat operation state including at least one of the slide location of the seat, or the reclining angle of the seat by using the seat position sensor; and
control an operation mode of the seat to the walk-in mode or an un-walk-in angle area mode through the first driving part and the second driving part, based on the seat operation state.

7. The seat control apparatus of claim 1, further comprising:
wherein the instructions are configured to, when being executed by the controller, cause the seat control apparatus to:
identify the reclining angle of the seat by using at least one Hall sensor; and
when it is identified that the reclining angle is included in the walk-in angle area, change a previous operation mode of the seat to an un-walk-in angle area mode.

8. The seat control apparatus of claim 1, wherein the instructions are configured to, when being executed by the controller, cause the seat control apparatus to:
when a walk-in control signal that instructs the seat to be controlled in the walk-in mode is received through the input part,
control the slide location of the seat to the walk-in location area by using the first driving part, and control the reclining angle of the seat to the walk-in angle area by using the second driving part; and
when an un-walk-in control signal that instructs the seat to be controlled in an un-walk-in angle area mode is received through the input part,
maintain a fastening state of a fixing part that fixes the slide location of the seat by the first driving part, and control the reclining angle of the seat to the un-walk-in angle area by using the second driving part.

9. The seat control apparatus of claim 1, wherein the input part includes a first switch disposed in one area of a backrest of the seat, and a second switch disposed in one area of a side cushion of the seat, and
wherein the instructions are configured to, when being executed by the controller, cause the seat control apparatus to:
when an input to the first switch, which exceeds a first time period, is received, activate an operation mode control of the seat; and
when an input to the second switch, which exceeds a second time period that is shorter than a first time period, is received, activate the operation mode control of the seat.

10. The seat control apparatus of claim 1, further comprising:
a rear seat passenger detecting sensor,
wherein the instructions are configured to, when being executed by the controller, cause the seat control apparatus to:
when it is identified that a user is present in a rear seat of the seat by using the rear seat passenger detecting sensor, increase an input maintenance requiring time period of the user input to the input part.

\* \* \* \* \*